Nov. 12, 1940.          S. L. CHRISTIE                2,221,307
           CONDUCTIVITY TESTING SYSTEM AND METHOD
                Filed May 10, 1937        2 Sheets-Sheet 1
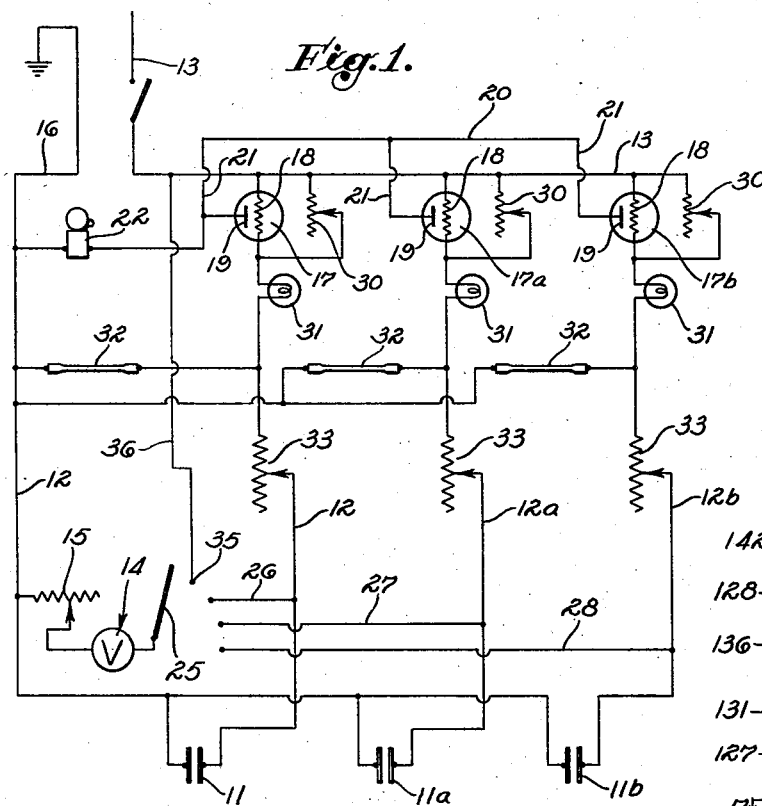
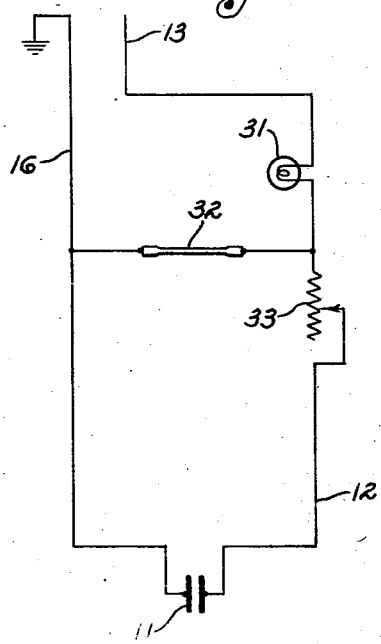
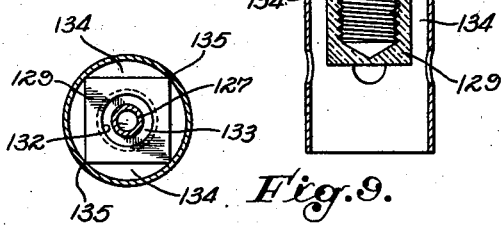
INVENTOR
SOREN L. CHRISTIE
BY HARRIS, KIECH, FOSTER & HARRIS
ATTORNEYS.

Nov. 12, 1940.   S. L. CHRISTIE   2,221,307
CONDUCTIVITY TESTING SYSTEM AND METHOD
Filed May 10, 1937   2 Sheets-Sheet 2
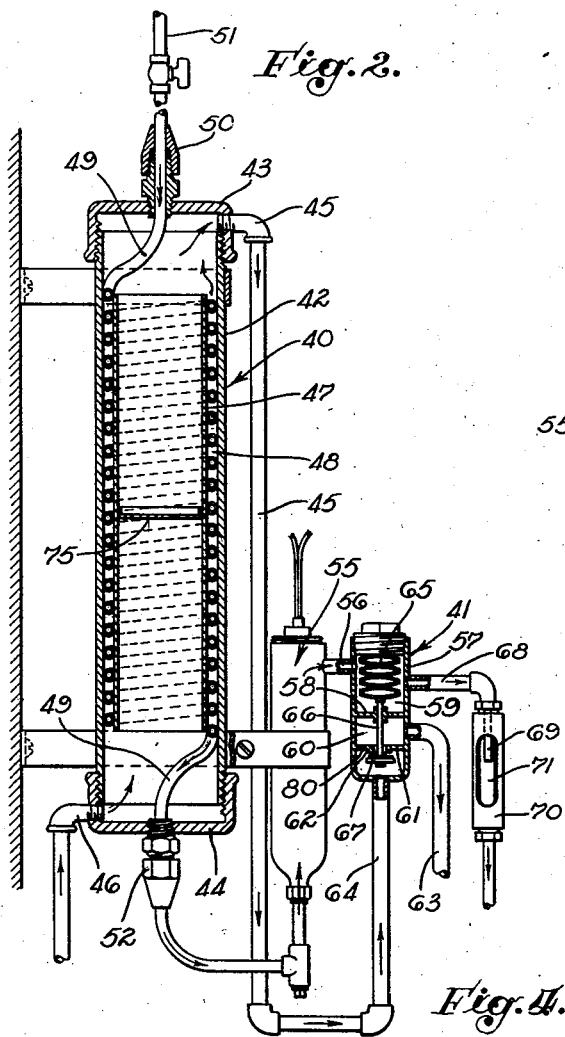
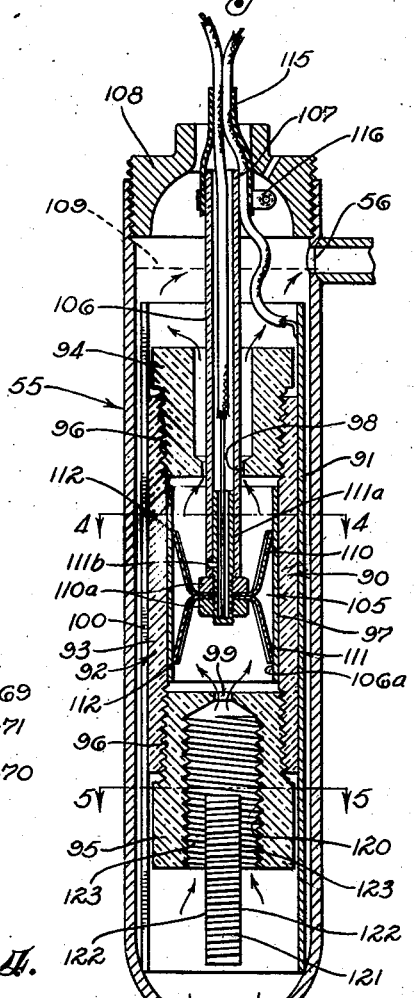
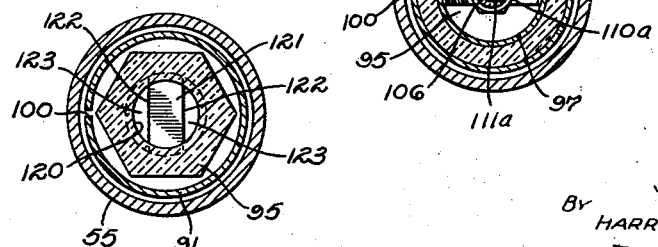
INVENTOR
SOREN L. CHRISTIE
BY HARRIS, KIECH, FOSTER & HARRIS
ATTORNEYS.

Patented Nov. 12, 1940

2,221,307

UNITED STATES PATENT OFFICE 2,221,307

CONDUCTIVITY TESTING SYSTEM AND METHOD

Soren L. Christie, Los Angeles, Calif.

Application May 10, 1937, Serial No. 141,698

30 Claims. (Cl. 175—183)

My invention relates to a novel method and apparatus for measuring the electric conductivity of fluids, usually liquids, to indicate concentration of impurities or other substances therein, or to indicate the electric conductivity of the fluids for any other purpose.

For instance, the invention may be used to indicate the solid content of a stream or body of water, or may be used to indicate the presence of foreign matter in condensed steam, boiler water, etc.

It is one of the objects of the present invention to provide a novel system for continuously measuring the electric conductivity of a flowing stream of such fluids as those above mentioned.

In the apparatus to be hereinafter described, I have illustrated a visible indicating means in the form of a calibrated current-responsive meter which indicates the electric conductivity or related phenomena of the fluid by measuring the current flow through current paths formed in the fluid between a plurality of electrodes immersed in the fluid.

In testing fluids of widely varying concentration, the temperatures of which also vary, it is necessary, as disclosed in my copending application Serial No. 83,661, "Compensated concentration testing system and method," filed June 5, 1936, to calibrate the indicating means or meter in accordance with the temperature of the fluid to be tested. In such calibrating systems it is usually necessary to be able to electrically change the conditions tending to send current through the fluid between the electrodes. In other words, in order to obtain accurate readings on the scale of the meter over the entire scale, it is usually necessary, to regulate the voltage supplying current to the electrodes as by a regulating transformer or a potentiometer. Such a system is not entirely satisfactory, due to the fact that both of the above mentioned types of instruments have the inherent characteristic of causing voltage drop under load. As it is difficult to obtain a constant voltage drop for a given load current under all voltage conditions, readings on the meter will be inaccurate in one part of the scale even though the meter has been calibrated accurately on another part of the scale. For this and other reasons it is difficult and expensive to obtain perfect compensation for variations in temperatures.

It is therefore an object of the present invention to provide an apparatus for testing the concentration of a fluid which includes, in combination with a current responsive indicating means adapted to indicate the conductivity of fluid flowing between a pair of electrodes, a means for bringing the temperature of the fluid at the point of contact thereof with the electrodes to a definite predetermined temperature below the boiling point thereof and for maintaining the temperature constant which obviates the necessity of calibrating the indicating means to correspond with varying temperatures of the fluid before the test is made. Flashing of part of the fluid into vapor or steam before testing the conductivity is not desirable as this may cause an increase in the concentration of solids in the remaining fluid. It is therefore an object of this invention to maintain the temperature of the fluid to be tested below its boiling point at the prevailing pressure.

It is desirable, however, in such a system as mentioned in the above paragraph, to adjust the indicating means or meter to compensate for voltage fluctuations in the supply line before the test is made. It is therefore another object of the invention to provide in such a system an adjustment means in the form of an adjustable resistor connected in circuit with the indicating means in such a manner that when the resistor is adjusted the meter may be made to read "zero" at, for example, full deflection on the scale regardless of the prevailing line voltage before the test is made.

It is another object of the invention to provide an apparatus which includes a pair of electrodes immersible in the fluid to be tested, a current-responsive indicating means, an adjustment means for adjusting the indicating means to compensate for voltage fluctuations in the current supply line, and a selector switch operable to first connect the compensating resistor and the indicating means in series across the supply line, and then connect both the indicating means and the electrodes across the supply line through a series resistance as, for example, a lamp, after the indicating means has been adjusted to register zero.

Such a system of continuously testing the conductivity of a fluid, as outlined above, is particularly adapted for operation in multiple from a single potential source; for instance, condensed steam or boiler water from a plurality of boilers may be simultaneously and continuously tested by providing a plurality of pairs of electrodes connected through individual circuits to a single potential source and connected with the indicating means through the selector switch above mentioned so that the individual circuits may be consecutively connected in circuit with the meter and the conductivity of the fluid being tested through the individual circuits registered on the scale of the meter.

In a system for continuously testing conductivity of a flowing fluid, such as the system mentioned in the above paragraph, it is desirable to provide alarm means for indicating when the conductivity of the fluid being tested by any of the respective circuits reaches a dangerous degree. Likewise, it is desirable to provide means for indicating which of the respective circuits is operating the alarm. It is therefore an important object of my invention to provide a multiple system of testing conductivity of separate streams or bodies of fluid, which includes a pair of electrodes immersible in the separate fluids, each of the pairs of electrodes having an individual circuit connecting the respective pairs of electrodes across a single potential source and each of the respective circuits having an electronic valve therein adapted to energize an alarm circuit when the conductivity of any of the respective fluids reaches a dangerous degree, there being also a visible signal connected in each of the circuits in such a manner as to indicate which of the respective circuits is energizing the alarm.

It is also an object of my invention to provide, in a system such as outlined generally in the above paragraph, a visible indicating means for each individual circuit, which indicating means indicate when the respective circuits are in order and which become inoperable when the conductivity of the fluid reaches a predetermined degree.

It is likewise an object of my invention to provide two specific forms of electrode structures particularly adapted for use in a system for continuously testing the conductivity of a flowing fluid. In fulfilling such an object, my present invention includes electrode structures suitable for insertion in pipe lines, or the like, and includes an arrangement of electrodes in which the electrodes form a fluid path through which fluid may flow when the structures are immersed in the fluid to be tested, and includes means for relatively adjusting the electrodes for varying both the area of the fluid path through which the fluid flows and for varying the current path between the electrodes through which current passes from one electrode to the other.

It is another object of my invention to provide an electrode structure which defines a fluid path through which fluid flows when the structure is immersed therein, the structure including one electrode to which current is fed by a movable contact arranged to scrape the electrode clean when the contact is moved relative thereto.

It is another object of my invention to provide an electrode structure including a pair of electrodes, the structure being arranged to define a fluid path through which fluid flows when the structure is immersed therein, and the structure including adjustment means for varying the total area of the fluid path.

It is another object of the invention to provide an electrode structure including a pair of electrodes, the structure defining a fluid path through which fluid flows when the structure is immersed in the fluid, the electrodes being arranged so that current flowing from one electrode to the other flows in a current path through the fluid, there being adjustable means included in the structure for varying the width of the current path.

It is another object of my invention to provide in combination, as a means for bringing a fluid to be electrically tested to a predetermined temperature and maintaining the temperature constant, a cooling unit including means for conducting a high temperature fluid through a circulating body of cooling medium, together with means responsive to the temperature of the fluid in the hot fluid conducting means at a certain point for controlling the circulation of the cooling medium.

These and other objects and features of the invention will be made clear in the following part of the specification.

Referring to the drawings,

Fig. 1 is a wiring diagram of my multiple system used in carrying out my method of continuously and simultaneously testing the conductivity of several separate bodies of fluid.

Fig. 2 illustrates a cooling unit embodying novel features of my invention associated with an electrode shell through which fluid to be tested is conducted.

Fig. 3 is a sectional view through the electrode shell of my invention and discloses a novel electrode structure embodying specific features which will be hereinafter referred to.

Fig. 4 is a horizontal section taken as indicated by the line 4—4 of Fig. 3.

Fig. 5 is a horizontal section taken as indicated by the line 5—5 of Fig. 3.

Fig. 6 is a sectional view of an electrode structure suitable as an alternative structure for the electrode structure illustrated in Fig. 3.

Fig. 7 is a horizontal section taken as indicated by the line 7—7 of Fig. 6.

Fig. 8 is a wiring diagram of a system suitable for use in carrying out my method of testing conductivity when only a single body or stream of fluid is being tested.

Fig. 9 is a diagrammatic view of a meter scale suitable for use in connection with the systems disclosed in Figs. 1 and 8.

My invention comprises in its broadest concept a plurality of electrodes 11 connected in a circuit 12 receiving current from a supply line 13, the circuit including a current-responsive indicating means 14 and an adjusting means 15 for compensating for voltage fluctuation in the current flowing in the circuit 12.

With reference to Fig. 1 of the drawings, I show a plurality of circuits similar to the circuit 12 connected in parallel with the circuit 12 to the supply line 13, these circuits being respectively designated by the numerals 12a and 12b and each of these circuits having a pair of electrodes, designated by the numerals 11a and 11b. As shown in the diagram, one side of each of the circuits 12, 12a and 12b, which circuits are completed through the electrodes 11, 11a, and 11b, is grounded through a common conductor 16.

In each of the circuits 12, 12a, and 12b is connected an electronic valve, illustrated in the form of rectifier tubes 17, 17a, and 17b which have their respective filaments 18 connected in series circuit in the circuits 12, 12a, and 12b. The plates 19 of the respective electronic valves 17, 17a, and 17b are connected in parallel or additive relation in an alarm circuit 20 by conductors 21, as shown. The electronic valves 17, 17a, and 17b are arranged in such a manner that when current flows from the filaments 18 of the valves to the plates 19 thereof, the alarm circuit will be energized. As shown, the return side of the alarm circuit is connected to the grounded side 16 of the supply circuit. Connected in the alarm circuit is an electrically energizable device for giving an alarm which is illustrated in the diagram as comprising a bell 22, but which in other instances might comprise a relay or solenoid for operating other forms of visible or audible alarm devices. It may also in certain cases, as in the case of a single circuit, be made in the form of an indicating device calibrated to measure the amount of current in the electrode circuit.

My invention includes means for connecting the indicating device or meter 14 and the adjustable resistor 15 across any of the circuits 12, 12a, and 12b. This means comprises a selector switch 25 movable to selectively engage contacts connected respectively to conductors 26, 27, and 28 which are respectively connected between the energized side of the circuits 12, 12a, and 12b and the grounded side of the supply circuit through the meter 14 and the resistor 15, as shown.

The invention includes means for varying the amount of current flowing through the filaments 18 of the valves 17, 17a, and 17b for adjusting the point at which current will flow from the filaments to the plates 19 to energize the alarm circuit. This means preferably comprises an adjustable resistor 30 shunted around each of the tubes 17, 17a, and 17b.

Although not essential in the operation of the system, I prefer that the system include a warning means in addition to the alarm means, giving visual indication when each of the respective circuits is in order and also an indication when any of the respective circuits is near the danger point. This warning means, in my preferred system, comprises a lamp 31 connected in each of the circuits 12, 12a, and 12b for receiving current which flows partly through the filaments 18 of the rectifier tubes 17, 17a, and 17b respectively. Likewise, a glow tube 32 is connected in each of the circuits to extend across the supply circuit or potential source from the energized side of each circuit to the return side of the supply circuit, as shown.

Connected in each of the circuits 12, 12a and 12b is a variable resistance 33, these resistances being connected in circuit and disposed so that the glow tubes 32 are connected to each circuit between these resistances and the respective lamps 31 of each circuit.

Positioned to be engaged by the selector switch 25 is a contact 35 connected by a conductor 36 to the energized side of the supply circuit so that when the selector switch 25 engages the contact 35, the meter 14 and the adjustable resistor 15 will be connected directly across the source of supply, as shown in the diagram, for a purpose which will now be described in connection with the explanation of the mode of operation of the parts of my novel system thus far described.

In the operation of the system, one or more pairs of the electrodes 11, 11a, and 11b, are immersed in the individual bodies of the liquid to be tested, or in some instances the electrodes may be included in permanent structures positioned in various pipe lines of boilers or the like. Due to characteristic voltage fluctuations in alternating current circuits, it is desirable to compensate for these fluctuations with respect to the calibrations on the meter 14 before the conductivity test is made. This may be accomplished by operating the selector switch 25 to engage the contact 35 and manipulating the compensating resistor 15 until the meter reads zero. When it is desired to take a meter reading of the conductivity of the fluid being tested by any one of the circuits 12, 12a, or 12b, the selector switch 25 is moved to the contact connected to the desired circuit, and the reading of the conductivity of the fluid flowing between the electrodes of that circuit is read directly on the meter 14. The meter 14 is preferably calibrated, as shown in Fig. 9, so that the zero indication of the scale is disposed at the right of the scale at full deflection of the pointer and the scale is read from right to left.

The operation of the audible alarm and the visual warning means of the system is as follows. When sufficient current passes through the electrodes, the lamps 31 will glow with increasing intensity as the conductivity of the fluid or other substance between the electrodes increases. The current flowing to the electrodes 11, 11a and 11b of the respective circuits passes partly through the filaments 18 of the tubes 17, 17a, and 17b. When the current is of sufficient magnitude to heat the filament of an individual circuit, current will flow in the plate circuit comprising part of the alarm circuit 20 and the bell or relay 22 will operate. By varying the resistors 30 in the respective circuits, the point at which the alarm circuit is energized may be varied. The provision of the rectifier tubes connected in the circuits in the manner shown enables this point to be adjusted very definitely. As no current will pass between the filaments 18 and the plates 19 of the tubes when the filaments are relatively cold, the additive relation of the respective plate circuits will not add to energize the alarm circuit until each of the circuits is very close to the danger point. If several of the circuits are simultaneously near the danger point, the additive relation of the respective plate circuits will energize the alarm circuit at a somewhat earlier point than that for which each circuit is set, which is advantageous. The arrangement shown, however, does not additively affect the alarm circuit when the individual circuits are far from the danger point or when only one circuit is near the danger point.

An important feature of the arrangement just discussed in connection with the use of the electronic valves 17, 17a, and 17b, is that it makes it possible to use one common bell or other alarm device for a number of circuits, the alarm device being, if desired, positioned in a remote place.

In the operation of the warning means comprising the lamps 31 and the glow tubes 32, the glow tube 32 of each circuit will glow when no current or but a small current passes through the fluid between the electrodes 11, 11a, and 11b. The circuits are so balanced that when an appreciable current passes through any of the electrode circuits, the glow tubes 32 will stop glowing, and the lamp 31 will start to glow. This is due to the voltage drop in the lamp 31 when the magnitude of the current passing between the electrodes 11 is sufficient to cause the lamp to glow.

It will be seen that with the glow tubes 32 of the respective circuits glowing when there is little or no current passing between the electrodes of the respective circuits, these tubes serve to indicate that the respective circuits are in order, and when any of the lamps 31 of the respective circuits starts to glow it serves to indicate that the conductivity of the fluid being tested by that particular circuit is reaching a dangerous degree. Should the filament of any of the lamps 31 burn out, the glow tube of that circuit stops glowing, thereby indicating trouble even though no alarm has been given through the alarm circuit indicating a dangerous degree of conductivity of the fluid being tested.

In order that the size and consequently the resistance of the lamps 31 may be changed if desired, the series resistors 33 are provided in the respective circuits so that the sum of the total resistances in each circuit may be adjusted to remain unchanged and the calibration of the meter 14 will not be affected. A change in the size and resistance of the lamps 31 may be desired to vary the point at which the lamps start to glow. In some instances, the series resistors 33 may likewise be used for calibrating purposes.

Further, the magnitude of the electrode current for a given concentration of the fluid being tested may be varied to change the point at which the alarm starts to operate or to change the range of the regulation obtained by the shunted resistors 30 without disturbing the calibration of the meter 14 if the sum of the resistance of the lamps 31 and the series resistors 33 is changed in the same proportion as the resistance of the current path between the electrodes 11 at a given concentration.

It will be seen that by placing the glow tubes 32 between the lamps 31 and the series resistors 33, the operation of the glow tubes relative to the lamps 31 is not disturbed by varying the series resistors 33. Adjustment of the shunt resistors 30 does not appreciably vary the electric current or the meter readings, since the total parallel resistance of the filaments 18 and the shunt resistors 30 is very small compared with the total resistance of the circuits.

Since variations in temperature in the fluid or substance being tested seriously affect the readings of the meter 14, and since various systems of calibrating the meter to compensate for variations in temperature have been found to be undesirable for certain applications, I prefer to include in combination in my system means for automatically bringing the temperature of the fluid being tested at the point of contact of the fluid with the electrodes to a definite predetermined temperature and for maintaining this temperature constant.

The above mentioned means comprises generally a heat exchanging means 40 for bringing the fluid to be tested to a predetermined temperature and a means 41 automatically responsive to the temperature of the fluid at the point of contact thereof with the electrodes, for instance, the electrodes 11, for controlling the operation of the heat exchanging means 40.

Inasmuch as I have disclosed the invention in connection with continuously testing the conductivities of boiler waters or the like, the heat exchanging means 40 will be disclosed as a cooling unit, but it should be understood that I do not intend the novel features of the unit 40 to be limited to the function of cooling a fluid or vapor, since it is apparent that the combination of the means 40 and 41 for controlling the temperature of a fluid to be electrically tested for conductivity by the electrodes 11 may be utilized to either raise or lower the temperature of the fluid being tested.

In the preferred form of the invention the unit 40 comprises an outer shell 42 closed at each end by caps 43 and 44 having outlet and inlet pipes 45 and 46 connected thereto adjacent opposite ends thereof, as shown, for delivery of a heat exchanging medium, in this instance a cooling medium. Disposed within the shell 42 is an inner tubular or cylindrical member 47, the ends of which are in open communication with the upper and lower sections of the shell 42, the tubular member 47 being of a reduced diameter so as to provide an annular space 48 between the tubular member 47 and the shell 42. Disposed in the space 48 is a fluid conducting tube 49 arranged to provide exterior to its outer wall a tortuous channel or path through which cooling medium flowing from the inlet 46 to the outlet 45 of the shell must flow. One convenient manner of providing this tortuous path is to spiral the fluid conducting tube 49 substantially in the manner shown, the space 48 being such that the fluid conducting tube 49 is contiguous to both the outer shell 42 and the inner tubular member 47 so that the cooling medium must flow through the tortuous path provided in direct contact with the fluid conducting tube 49. The fluid conducting tube 49 extends through a packing gland 50 in the upper cap 43 to connect with a fluid delivery pipe 51, which in some instances may be a "take-off" pipe for delivering steam or boiler water to the cooling unit 40. The lower end of the fluid conducting tube 49 is extended through a packing gland 52 in the lower cap 44 to connect with the delivery opening of an electrode shell 55 in which a pair of electrodes, which may be considered one of the pairs of electrodes 11, 11a, or 11b described in connection with Fig. 1, is supported in contact with fluid delivered to the shell 55 by the fluid conducting tube 49. Fluid flowing through the electrode shell 55 is delivered therefrom through an outlet opening 56 to the control means 41 which is operable to control the delivery of cooling medium to the shell 42 of the unit 40 in a manner which will now be described.

The control means 41 of the preferred form of my invention comprises a housing 57 having a dividing wall 58 in the interior thereof cooperating with the walls of the housing to form a control chamber 59 and a valve chamber 60. Dividing the valve chamber 60 is a wall 61 having an opening therein surrounded by a valve seat 62. Communicating with the valve chamber 60 above the wall 61 is an outlet pipe 63, and connecting with the chamber 60 below the wall 61 is an inlet pipe 64. Confined in the control chamber 59 is a sylphon bellows 65 which is connected with a valve stem 66, journaled in the wall 58, upon the lower end of which is a valve 67 engaging the seat 62 on the wall 61, substantially as shown. Communicating with the control chamber 59 is a fluid outlet pipe 68 which terminates downwardly in a drip tube 69 enclosed in a housing 70 having a window 71 therein for observing the flow of fluid from the drip tube 69. The inlet pipe 64 communicating with the valve chamber 60 is connected as shown with the outlet pipe 45 of the shell 42, the pipe 63, the valve chamber 60, the pipes 64 and 45 serving as an outlet means for cooling medium delivered to the cooling unit 40.

By the arrangement described a small leakage through the wall 58 along the valve stem 66 is not objectionable, since the control chamber 59 is so disposed that the fluid passes therethrough after passing through the electrode chamber, thus preventing mixing of cooling medium and fluid to be tested in the electrode chamber. Furthermore since the regulating valve 67 and the control chamber 59 are both placed after the cooling unit, the temperatures of the fluids in the valve chamber 60 and in the control chamber 59 are in a close relationship and normally within a few degrees from each other. Therefore the action of the thermal control unit 65 is also not materially affected by a small leakage between the valve stem and its sleeving. This is an important feature of the invention as it greatly simplifies the design.

The operation of the above described control device in connection with the cooling unit 40 is as follows. Hot liquid delivered from the pipe 51 into the fluid conducting tube 49 of the cooling unit flows through the spiral tube 49, the tube 49 being in direct contact throughout its tortuous path with the cooling fluid within the shell 42, and the cooled fluid is taken from the shell 42 into the electrode shell 55 and passed therethrough to emerge through the outlet opening 56 into the control chamber 59 of the control means 41 and passes out of this chamber through the outlet pipe 68, whereupon it may be either disposed of as sewage or recirculated into the boiler or the like from which it has been taken. The fluid passing directly from the electrode shell 55 into the control chamber 59 in contact with the Sylphon bellows 65 causes the bellows to react in a well known manner to reciprocate the stem 66 carrying the valve 67 to control the operation of the valve 67 and thus the flow of cooling medium through the pipe 45 from the shell 42.

The inner tubular member 47 is preferably open at each end and provided with a plug 75 intermediate the ends, thus preventing flow of fluid through the tube 47 from one end to the other end and confining the flow to the space 48. The cylinder 47 may be solid, or capped at each end, but I prefer the single plug as shown. A feature of my invention is that the inner cylindrical member 47 is not a part of the main body 40 but removably supported within the same, preferably by engagement with the tube 49 alone as shown. This simplifies the design and facilitates cleaning and replacement of interior parts.

In order that the flow of the cooling medium through the shell 42 will not at any time be entirely stopped, I prefer to provide a by-pass orifice 80 in the wall 61 so that even when the valve 67 is closed, the cooling medium is delivered to the shell 42 in sufficient quantity to maintain at least a slight circulation of the cooling medium within the shell 42.

It will be seen from the foregoing description that the unit just described in connection with Fig. 2 operates to main the temperature of the fluid being tested by the system disclosed in Fig. 1 constant while the conductivity of the continuously flowing fluid is indicated on the direct reading meter 14.

Although in a broader concept my invention as embodied in the disclosure of Fig. 1 is satisfactorily capable of use with any type of electrodes adapted to be immersed in the fluid to be tested, which might be stationary bodies of fluid or continuously flowing fluids, I prefer to utilize a novel electrode structure adapted for insertion in, for instance, a pipe line, two forms of which structure are disclosed herewith. Referring to Fig. 3, I show my preferred form of electrode structure which is adapted to be positioned in a pipe line or disposed in the electrode shell 55 previously mentioned in connection with the cooling unit shown in Fig. 2. The electrode structure generally designated by the numeral 90 includes preferably an outer tubular electrode 91 positioned axially in the electrode shell 55. Suitable support means for suspending the tubular electrode 91 in the shell may be provided, or, as shown, the electrode 91 may merely rest on the bottom wall of the shell. Disposed within the tubular electrode 91 and supported thereby is an insulating structure 92 comprising a sleeve 93 having plugs 94 and 95 closing the opposite ends thereof, these plugs being removable as by threads 96. Supported within the sleeve 93 between the plugs 94 and 95, preferably by frictional engagement with the sleeve 93, is an inner tubular electrode 97. Formed in the end plugs 94 and 95 are restricted passages 98 and 99 which communicate with the interior of the sleeve 93 and cooperate with the inner tubular electrode 97 in defining a fluid path through which a portion of the fluid flowing through the electrode shell 55 must flow. Some of the fluid passing through the shell 55 may flow around the exterior of the outer tubular electrode 91 even though the outer electrode rests directly on the bottom of the shell as shown for the reason that the outer electrode is split as indicated at 100 throughout its entire length. The flow of fluid around the exterior of the outer electrode, however, is not essential, the split 100 being provided merely for convenience of insertion of the insulating structure 92 therein. In some instances, the electrode 91 may be omitted and substituted by the wall of the shell 55.

The electrodes 91 and 97 are connected across a potential source, for instance, as is shown in Fig. 1, in one of the circuits 12, 12a or 12b, which causes current to flow in a path through the fluid in the shell 55, the current path in this form of electrode structure being defined by the inner tubular electrode 97, the restricted passages 98 and 99, and the remaining passage through the plugs 94 and 95.

It is an important function of my structure to provide relatively large effective contact surfaces of the electrodes confined in a small space. This is accomplished by providing small openings of the relatively large contact chamber and arranging the contact surface substantially along the periphery of the chamber. Thus the current will flow, not only to the edge of the contact surface, as would be the case in a straight unrestricted passage, but will spread substantially over the whole inner surface, thereby reducing the current density and avoiding undesired local concentration of current.

This form of electrode structure includes a novel means for bringing current to the inner electrode 97 which, when used in connection with the system shown in Fig. 1, is preferably the energized electrode. This means comprises a contact member 105 adapted to resiliently engage the inner contact surface 106a of the electrode 97, the contact member 105 being secured to a rigid tubular insulating shield 106 which extends through one of the restricted openings of the end plugs, for instance the opening 98 of the end plug 94. The upper end 107 of the shield 106 terminates just short of a removable cap 108 threaded into the upper end of the shell 55 and well above the normal surface of the liquid in the shell 55 designated by the numeral 109, this surface level being determined by the normal flow of liquid from the outlet 56 of the shell. The contact member designated generally by the numeral 105 preferably comprises a pair of U-shaped resilient contacts 110 and 111 disposed so that the legs thereof extend in opposite directions, the contacts being secured in this relationship to the end of the rigid shield 106 by suitable means such as a pair of nuts 110a threadedly engaging a metal insert 111a retained in the inner end of the tubular insulating shield 106, by means of a stop in 111b, as shown. The arms of the contact members 110 and 111 are provided on their extremities with scraping edges 112 shaped to conform to the interior configuration of the electrode 97, as best shown in Fig. 4. The purpose of the scraping edges of the movable contact member 105 is that, upon removal of the cap 108, the upper end 107 of the shield 106 may be grasped so that the contact member may be reciprocated longitudinally and at the same time rotated, the resultant scraping action of the edges 112 thoroughly cleaning the inner contact surface 106a of the electrode 97.

The tubular shield 106 affords a convenient means for bringing the energized conductor of the electrode circuit into the shell 55, and, as shown, the energized conductor is brought into the shell through an opening in the cap 108 and extended downwardly through the shield 106 to be secured in contact with the metal insert 111a in the inner end of the tubular shield 106 which is secured to a part of the contact member 105, as above described. The outer tubular electrode 91 is connected to the ground side of the circuit by a conductor which also extends through the opening in the cap 108 and is suitably secured to the upper end of the outer electrode, as by soldering or the like. In practice I prefer to provide a shroud 115, formed of rubber or other resilient material, which surrounds the conductors extending to the electrodes and which is adapted to be distended to extend over the upper end 107 of the shield 106, the shroud 115 being secured thereto by a suitable clamp 116.

It is a feature of my invention that there are no exposed terminals on the outer surface of the electrode shell 55, the connecting terminals of the electrodes being within the shell and below the normal surface of the liquid therein, which obviates leakage of current which is inherent in exposed terminals when they are wet.

This form of electrode structure preferably includes adjustment means for varying the area of the fluid path formed within the plug 95. This function of varying the total area of the fluid path is best accomplished by providing in one of the end plugs, for instance the plug 95, a threaded recess 120 extending inwardly from the outer end of the plug 95 to communicate with the restricted passage 99, and being of substantially larger diameter than the passage 99, as shown. Threaded into the recess 120 is a plug 121 which is flattened on two opposite sides thereof as indicated at 122 so that it only partially fills the cross-sectional area of the recess 120, thus providing restricted channels 123 through which fluid must flow to enter the passage 99 and contact the inner electrode 97. It will be seen that when the plug 121 is threaded inwardly or outwardly in the recess 120, the effective length of restricted area of the channels is increased or decreased.

I have shown in Fig. 6 an alternative form of electrode structure suitable for use in connection with the electrode shell 55 disclosed in Fig. 3, in combination with the unit for controlling the temperature of the liquid disclosed in Fig. 2, but which is also adapted to be merely immersed in the fluid to be tested without being confined by the shell 55. This structure comprises an outer tubular open-ended electrode 125 in which is positioned an insulating structure 126 adapted to support an inner elongated electrode 127 in axial relation with the outer tube 125. The insulating structure 126 comprises a pair of insulating blocks 128 and 129, one of the blocks, for instance the block 128, having an inward recess formed therein into which one end of the electrode 127 extends to be secured therein by a pin 131, substantially as shown. The other block, for instance the block 129, is provided with an inwardly facing threaded recess 132 into which a threaded boss 133 formed on the lower end of the electrode 127 is threaded. Both of the blocks 128 and 129 are formed to provide in conjunction with the outer tubular electrode 125 passages 134 which constitute fluid paths through the electrode structure. The provision of the passages 134 may best be accomplished by forming the blocks 128 and 129 square, as shown best in Fig. 7, and of such size that the corners 135 of the blocks slidably engage the inner diameter of the outer tubular electrode 125. The inner elongated electrode 127 is preferably formed of a tube so that an energized conductor 135a may be extended downwardly through a bore 136 formed in the block 128 and through the tubular electrode 127 to be secured to the electrode, as by soldering or other suitable means, in the manner shown. Secured to one side of the block 128 is a spring contact 137 which is preferably looped downwardly and upwardly to terminate at the upper free end thereof in a hook 138 adapted to extend over one peripheral edge of the outer electrode 125, serving to support the insulating structure and the inner electrode in the positions shown. A grounded conductor 139 is connected to the spring contact 137 through a bore 140 formed in the plug 128. As shown, the plug 128 forms an insulating shield extending from the energized electrode 127 to the exterior of the outer tubular electrode 125, well beyond the end thereof. In addition to thus shielding the conductors 135a and 139, I prefer to provide a shroud 141 formed of insulating material, preferably a resilient material such as rubber, which surrounds the conductors 135a and 139 and extends downwardly into a recess 142 provided in the outer end of the block 128 in sealing engagement therewith. In practice, the shielding means, which may be considered to include the block 128 and the shroud 141, is intended to extend above the surface of the fluid in which the electrode structure is immersed so that there will be no exposed terminals above the surface of the liquid. The blocks 128 and 129 define a current path between the electrodes 127 and 125 through the fluid in which the electrode structure is immersed. The threaded engagement between the inner electrode 127 and the block 129 comprises a means for varying th width of the current path between the electrodes, this operation being accomplished by withdrawing the insulating structure from the outer tubular electrode and relatively rotating the blocks 128 and 129 to vary the spacing therebetween by the inter-action of the threaded recess 132 and the threaded boss 133.

In some instances it may not be necessary or desirable to continuously test the conductivity of more than a single stream or body of fluid, and in this connection I have shown in Fig. 8 a wiring diagram of a simplified form of my system. It will be noted that in this modified form the alarm system including the alarm circuit 20 and the electronic valves 17, 18, and 19 has been dispensed with, and that only a single circuit 12 is utilized. Also, that the direct reading meter 14 together with its associated calibrating resistor 15 and selector switch 25 have been omitted.

In such a circuit, the operation of the warning means, including the glow tube 32 which glows when little or no current flows through the fluid between the electrodes 11 and the lamp 31 which starts to glow when the magnitude of the current flowing between the electrodes reaches a predetermined degree, is the same as that of the warning means disclosed in connection with Fig. 1. Likewise, the series resistor 33 is provided for the purpose of balancing the circuit so that when the size and resistance of the lamp 31 are changed, the total resistance of the circuit can be adjusted so that the lamp and glow tube may be made to glow at the desired degree of conductivity of the fluid being tested.

I have disclosed my invention in practical form and as simply as possible; however, it should be understood that the invention is not intended to be limited to the details of construction disclosed and described, for the reason that various other arrangements of the parts shown might be made and various modifications of the alternative forms of electrode structures described might be devised for carrying out my novel method of continuously testing the conductivity of a fluid while maintaining the temperature of the fluid constant at the point of contact thereof with the electrodes, all coming within the scope of the invention which should be interpreted solely by the language of the appended claims.

I claim as my invention:

1. In a device for testing the conductivity of a flowing fluid, the combination of: a shell providing a plurality of electrodes positioned in the interior thereof and having an inlet and an outlet for passing fluid to be tested through said shell in contact with said electrodes; an electric circuit including a potential source and connected to said electrodes for impressing a potential thereacross; an indicating means responsive to current flowing in said circuit; a compensating resistor and a series resistance in said circuit; a selector switch operable to first connect said compensating resistor and said indicating means in series across said potential source and then to connect both said indicating means and said electrodes in parallel connection across said potential source through said series resistance, said compensating resistor being adjustable whereby said indicating means is calibrated to compensate for voltage fluctuations in said circuit before said electrodes are connected therein; and means associated with said shell for automatically maintaining the fluid flowing therein at a constant temperature.

2. A combination as defined in claim 1 in which said last-named means includes: a cooling unit having fluid conducting means surrounded by a cooling medium and from which said fluid flows into said inlet of said shell; and automatic means responsive to the temperature of said fluid flowing from said fluid conducting means for controlling the flow of said cooling medium through said cooling unit.

3. In a device for testing the conductivity of a substance, the combination of: an electric circuit including a potential source; an indicating means responsive to current flowing in said circuit; a plurality of electrodes arranged in contact with said substance and connected in said circuit for receiving an applied potential thereacross; a compensating resistor and a series resistance in said circuit; means for connecting said compensating resistor and said indicating means in series circuit across said potential source and subsequently connecting both said indicating means and said electrodes in parallel across said potential source through said series resistance, said compensating resistor being adjustable whereby said indicating means is calibrated to compensate for voltage fluctuations in said circuit before said electrodes are connected in said circuit; an electronic valve in said circuit through which a portion of the current to said electrodes flows; and an alarm electrically associated with said electronic valve to be energized thereby when the conductivity of said substance reaches a predetermined degree.

4. In a device for testing the conductivity of a substance, the combination of: an electric circuit including a potential source; an indicating means responsive to current flowing in said circuit; a plurality of electrodes arranged in contact with said substance and connected in said circuit for receiving an applied potential thereacross; a compensating resistor and a series resistance in said circuit; means for connecting said compensating resistor and said indicating means in series circuit across said potential source and subsequently connecting both said indicating means and said electrodes in parallel across said potential source through said series resistance, said compensating resistor being adjustable whereby said indicating means is calibrated to compensate for voltage fluctuations in said circuit before said electrodes are connected in said circuit; means for automatically maintaining said substance at a constant temperature at the point of contact of said substance with said electrodes; an electronic valve in said circuit through which a portion of the current to said electrodes flows; and an alarm electrically associated with said electronic valve to be energized thereby when the conductivity of said substance reaches a predetermined degree.

5. In a device for testing the conductivity of a fluid, the combination of: an electric circuit including a potential source; a plurality of electrodes immersible in the fluid to be tested and connected in said circuit for receiving an applied potential thereacross; and a warning means in said circuit comprising a lamp connected in series with said electrodes and a glow tube connected across said potential source from one line to a point on the other line between said lamp and said electrodes, said circuit being balanced so that said glow tube glows when said fluid has a relatively low degree of conductivity and stops glowing when the conductivity of said fluid reaches a sufficiently high degree of conductivity to cause said lamp to glow.

6. In a device for testing the conductivity of a fluid, the combination of: an electric circuit including a potential source; a plurality of electrodes immersible in the fluid to be tested and connected in said circuit for receiving an applied potential thereacross; and warning means comprising a lamp connected in series with said electrodes and a glow tube connected in said circuit in such a manner that it glows when said fluid has a relatively low degree of conductivity and stops glowing when the conductivity of said fluid reaches a degree sufficient to cause said lamp to burn, the voltage drop in said lamp causing said glow tube to stop glowing.

7. In a device for testing the conductivity of a fluid, the combination of: an electric circuit including a potential source; a plurality of electrodes immersible in the fluid to be tested and connected in said circuit for receiving an applied potential thereacross; warning means comprising a lamp connected in series with said electrodes and a glow tube connected in said circuit in such a manner that it glows when said fluid has a relatively low degree of conductivity and stops glowing when the conductivity of said fluid reaches a degree sufficient to cause said lamp to burn, the voltage drop in said lamp causing said glow tube to stop glowing; and an adjustable resistance in circuit with said lamp for varying the magnitude of the current flowing to said electrodes, said resistance being positioned in said circuit so that adjustment thereof does not affect the operation of said glow tube in respect to said lamp.

8. In a device for testing the conductivity of a fluid, the combination of: an electric circuit including a potential source; an indicating means responsive to current flowing in said circuit; a plurality of electrodes immersible in said fluid and connected in said circuit for receiving an applied potential thereacross; an electronic valve in said circuit through which a portion of the current to said electrodes flows; a variable resistor in said circuit in shunting relationship with an element of said valve; a compensating resistor and a series resistance in said circuit; and a selector switch operable to first connect said compensating resistor and said indicating means in series across said potential source and then connect both said indicating means and said electrodes in parallel across said potential source through said series resistance, said compensating resistor being adjustable whereby said indicating means is calibrated to compensate for voltage fluctuations in said circuit before said electrodes are connected therewith.

9. In a device for testing the conductivity of a fluid, the combination of: an electric circuit including a potential source; an indicating means responsive to current flowing in said circuit; a plurality of electrodes immersible in said fluid and connected in said circuit for receiving an applied potential thereacross; an electronic valve in said circuit through which a portion of the current to said electrodes flows; an alarm electrically associated with said electronic valve to be energized thereby when the conductivity of said fluid reaches a predetermined degree; a resistor in said circuit in shunting relation with an element of said valve and adjustable to determine the degree of conductivity of said fluid at which said valve energizes said alarm; a compensating resistor and a series resistance in said circuit; and a selector switch operable to first connect said compensating resistor and said indicating means in series across said potential source and then connect both said indicating means and said electrodes in parallel across said potential source through said series resistance, said compensating resistor being adjustable whereby said indicating means is calibrated to compensate for voltage fluctuations in said circuit before said electrodes are connected therein.

10. In a device for testing the conductivity of fluids, the combination of: a plurality of electrode circuits each having a pair of electrodes connected therein and adapted to be immersed in fluid to be tested; a potential source supplying current to said electrode circuits; an electronic tube in each circuit, said tubes having the filaments thereof connected in said respective electrode circuits; a common alarm circuit for said electrode circuits, said alarm circuit having the plates of said tubes connected thereto in parallel relation to each other and having an alarm means energizable when current flows between the filament and the plate of any of said tubes; an indicating means responsive to current flowing in said electrode circuits; and a selector switch for selectively connecting said indicating means to said electrode circuits.

11. In a device for testing the conductivity of a fluid, the combination of: an electric circuit including a potential source; an indicating means responsive to current flowing in said circuit; a plurality of electrodes immersible in the fluid to be tested and connected in said circuit for receiving an applied potential thereacross; an electronic valve in said circuit through which a portion of the current to said electrodes flows; an alarm electrically associated with said valve to be energized thereby when the conductivity of said fluid reaches a predetermined degree; and visible warning means comprising a glow tube connected in said circuit to glow when the conductivity of said fluid is below a predetermined degree and a lamp connected in said circuit to glow when the conductivity of the fluid is above a predetermined degree.

12. In an electrode cartridge for testing the conductivity of a fluid, the combination of: a pair of tubular electrodes disposed one within the other; an insulating structure spacing said electrodes and having walls enclosing said inner electrode and forming restricted passages communicating with the interior of the inner electrode whereby interelectrode currents are constrained to pass through said passages, said restricted passages and said inner electrode forming a fluid path; and conductor means comprising mutually insulated leads respectively connected to said electrodes.

13. In an electrode cartridge for testing the conductivity of a fluid, the combination of: a pair of tubular electrodes disposed one within the other; an insulating structure spacing said electrodes and having walls enclosing said inner electrode and forming restricted passages communicating with the inner electrode whereby interelectrode currents are constrained to pass through said passages, said restricted passages and said inner electrode forming a fluid path; and conductor means comprising mutually insulated leads respectively connected to said electrodes.

14. In an electrode cartridge for testing the conductivity of a fluid, the combination of: a pair of electrodes disposed one within the other; an insulating structure spacing said electrodes and having walls forming restricted passages communicating with the interior of the inner electrode, said restricted passages and said inner electrode forming a fluid path through which a portion of the fluid flows; an adjustment member movable in one of said restricted passages to vary the area of said passage; and conductor means comprising mutually insulated leads respectively connected to said electrodes.

15. In an electrode cartridge for testing the conductivity of a fluid, the combination of: a pair of tubular electrodes disposed one within the other; an insulating structure spacing said electrodes and cooperating with said inner electrode to define a fluid path insulated from and spaced within the outer electrode through which fluid in which said electrodes are immersed flows, whereby interelectrode currents are constrained to flow along said path; conductor means comprising mutually insulated leads respectively connected to said electrodes; and an insulating shield surrounding the conductor connected to said inner electrode and extending to the exterior of said outer electrode.

16. In an electrode cartridge for testing the conductivity of a fluid, the combination of: a shell having an inlet and an outlet through which fluid to be tested continuously flows into and out of said shell; a pair of tubular electrodes disposed one within the other and supported in said shell; an insulating structure spacing said electrodes and having walls forming passages communicating with opposite ends of the inner electrode, said passages and said electrode forming a fluid path through which a portion of said liquid in said shell flows; a contact member slidably engaging the interior surface of said inner electrode; conductor means comprising mutually insulated leads respectively connected to said electrodes; and a rigid insulating shield fixed to said slidable contact member and surrounding the conductor member connected thereto, said shield extending through one end passage of said insulating structure to project above the level of said fluid in said shell whereby said shield may be grasped and moved relative to said structure to cause said contact member to scrape the contact surface of said inner electrode to clean the same.

17. In an electrode cartridge for testing the conductivity of a fluid, the combination of: a shell having an inlet and an outlet through which fluid to be tested continuously flows into and out of said shell; a pair of tubular electrodes disposed one within the other and supported in said shell; an insulating structure spacing said electrodes and having walls forming passages communicating with opposite ends of the inner electrode, said passages and said electrode forming a fluid path through which a portion of said liquid in said shell flows; a contact member slidably engaging the interior surface of said inner electrode; a conductor means comprising mutually insulated leads respectively connected to said electrodes; a rigid insulating shield fixed to said slidable contact member and surrounding the conductor member connected thereto, said shield extending through one end passage of said insulating structure to project above the level of said fluid in said shell whereby said shield may be grasped and moved relative to said structure to cause said contact member to scrape the contact surface of said inner electrode to clean the same; and an adjustment member movable in the other end passage of said structure to vary the area thereof.

18. An electrode structure including a tubular electrode having a contact member for delivering current thereto, said contact member frictionally engaging the inner surface of said electrode and having a scraping edge conforming to said surface, there being a rigid insulating member fixed to said contact member and extending beyond an end of said electrode, whereby longitudinal and rotational movement of said insulating member causes said scraping edge to clean the inner surface of said electrode.

19. A structure as defined in claim 18 in which said insulation member surrounds and shields a conductor connected to said contact member.

20. In an electrode structure for use in testing the conductivity of fluids, the combination of: a metal tube comprising an outer electrode; a hollow insulating structure within said outer tube having end walls forming restricted passages; a metal tube within said hollow structure comprising an inner electrode, said passages in said insulating structure and said inner electrode forming a fluid path through which fluid may flow; and an adjustment plug filling part of the cross-sectional area of one of said passages and movable longitudinally therein to vary the total area of that passage.

21. In an electrode cartridge for testing the conductivity of a fluid, the combination of: a tubular electrode; a second electrode; an insulating structure comprising a pair of blocks engaging opposite ends of said second electrode and disposed in said tubular electrode to support said second electrode therein and defining a current path between said electrodes, said blocks being formed to provide passages for the flow of fluid longitudinally through said tubular electrode, one of said blocks being longitudinally movable relative to said electrodes to vary the width of said current path; and conductor means comprising mutually insulated leads respectively connected to said electrodes.

22. In an electrode cartridge for testing the conductivity of a fluid, the combination of: a tubular electrode; a second electrode; an insulating structure comprising a pair of blocks engaging opposite ends of said second electrode and disposed in said tubular electrode to support said second electrode therein and defining a current path between said electrodes, said blocks being formed to provide passages for the flow of fluid longitudinally through said tubular electrode, one of said blocks being threaded to said second electrode so that relative rotation of said blocks varies the space between said blocks and thus the width of said current path between said electrodes; and conductor means comprising mutually insulated leads respectively connected to said electrodes.

23. In an electrode cartridge for testing the conductivity of a fluid, the combination of: a tubular electrode; a second electrode; an insulating structure comprising a pair of blocks engaging opposite ends of said second electrode and disposed in said tubular electrode to support said second electrode therein and defining a current path between said electrodes, said blocks being formed to provide passages for the flow of fluid longitudinally through said tubular electrode; an insulating shield extending from one of said blocks; and conductor means extending through said shield to supply current to said electrodes.

24. In a device for testing the conductivity of a flowing fluid, the combination of: an electric circuit including a potential source; an indicating means responsive to current flowing in said circuit; a plurality of electrodes to contact said flowing fluid and connected in said circuit for receiving an applied potential thereacross; a heat exchanging unit comprising an outer shell having means for flowing a heat exchanging medium therethrough, an inner tube disposed within and spaced from said shell, and a conducting tube for conducting fluid to be thermally controlled through said shell, said conducting tube being disposed between said shell and said inner tube in a manner providing a tortuous path through which said heat exchanging medium must flow in direct contact therewith; and means responsive to the temperature of the fluid in said conducting tube after it emerges from said shell for controlling the delivery of said heat exchanging medium to said shell.

25. In an electrode cartridge for testing the conductivity of a fluid, the combination of: an insulating housing having walls defining an interior passage, and inlet and outlet openings communicating therewith; a first electrode enclosed within said housing and exposed only within said interior passage, said housing being adapted for immersion in the fluid to be tested to bring said first electrode below the exterior level of said fluid and allowing said liquid to enter said interior passage and to contact said first electrode therein, said insulating housing preventing contact of said first electrode with exterior fluid; a second electrode positioned for causing current to flow between said electrodes internally along said passage, said first electrode forming part of the side wall defining the cross-section of the fluid path whereby the electric current passing through said interior passage is outwardly diverged substantially radially to contact said first electrode, and said second electrode substantially surrounding said outlet opening of said passage from said housing; and conductor means comprising mutually insulated leads respectively connected to said electrodes.

26. In an electrode cartridge for testing the conductivity of a fluid, the combination of: an insulating housing having walls forming an internally enlarged contact chamber; walls forming an opening in said housing communicating with said chamber for access to the fluid to be tested, said opening having a restriction therein; a first electrode internally disposed in said contact chamber and forming part of the interior side wall surrounding the fluid within said chamber; a second electrode substantially surrounding said opening, said first and second electrodes being so disposed that current flowing from one to the other must pass through said restricted opening; and conductor means comprising mutually insulated leads respectively connected to said electrodes.

27. In an electrode cartridge for testing the conductivity of a fluid, the combination of: an insulating housing having walls forming an internally enlarged contact chamber providing a restricted opening for access to a fluid to be tested; a first electrode internally disposed in said contact chamber; a second electrode substantially surrounding said insulating housing, said first and second electrodes being so disposed that current flowing from one to the other must pass through said restricted opening; and conductor means comprising mutually insulated leads respectively connected to said electrodes.

28. In an electrode cartridge for testing the conductivity of a fluid, the combination of: an insulating housing having walls forming an internally enlarged contact chamber; walls forming an opening in said housing communicating with said chamber for access to the fluid to be tested, said opening having a restriction therein; a first electrode internally disposed in said contact chamber; a second electrode substantially surrounding said opening; and an adjustment member movable in said opening to vary the proportion of effective area relative to the effective length of the liquid path between said electrodes.

29. In a device for testing the conductivity of a flowing fluid, the combination of: an electric circuit including a potential source; an indicating means responsive to current flowing in said circuit; a plurality of electrodes to contact said flowing fluid and connected in said circuit for receiving an applied potential thereacross; and thermostatic means for controlling the temperature of the flowing fluid, the last-named means including a closed shell having an inlet and an outlet through which a heat-exchanging medium flows into and out of said shell, an inner cylinder disposed within and spaced from said shell, fluid conducting means comprising a tube disposed in the space between said shell and said inner cylinder in a manner providing a tortuous path through which said heat-exchanging medium must flow in contact therewith, and means disposed to prevent the flow of said heat-exchanging medium through said inner cylinder.

30. In a device for testing the conductivity of a flowing fluid, the combination of: an electric circuit adapted to be connected to a potential source; an indicating means in said circuit responsive to current flowing therein; a plurality of electrodes to contact said flowing fluid and connected in said circuit for receiving an impressed potential thereacross, whereby a current may be caused to flow through said fluid and in said circuit in a quantity varying with the conductivity of said fluid; and means for controlling the temperature of the flowing fluid, said last named means comprising a heat exchanger, means to pass the flowing fluid through said heat exchanger prior to contact with said electrodes, means to pass a heat exchange medium through said exchanger and out of direct contact with the flowing fluid, whereby heat may be interchanged between said fluid and medium without physical intermingling thereof, valve means to regulate the flow of said heat exchange medium, thermostatic means for actuating said valve means, and means for conducting the effluent from said electrodes in operative relationship to said thermostatic means, whereby the temperature of the flowing test fluid is automatically maintained at a given value while preventing possible contamination of the flowing fluid by said thermostatic means prior to contact with said electrodes.

SOREN L. CHRISTIE.